United States Patent [19]
Katayama

[11] Patent Number: 6,071,002
[45] Date of Patent: Jun. 6, 2000

[54] SYSTEM AND METHOD FOR CONFIRMING AND CORRECTING OFFENSIVE AND/OR DEFENSIVE POSTURES IN A TEAM BALL GAME

[76] Inventor: Muneomi Katayama, 1-12, Wakaba, Shinjyuku-ku, Tokyo, Japan

[21] Appl. No.: 08/859,527

[22] Filed: May 20, 1997

[51] Int. Cl.⁷ ................................................. G06F 17/00
[52] U.S. Cl. ...................... 364/410.1; 434/251
[58] Field of Search ............................. 463/2, 4, 5, 30, 463/31, 36; 434/247, 248, 251; 364/410.1; 273/317.1, 317.2, 317.3, 317.4, 317.5, 317.6, 459, 460, 461; 340/323 B

[56] References Cited

U.S. PATENT DOCUMENTS

| | | | |
|---|---|---|---|
| 4,359,223 | 11/1982 | Baer et al. | 463/2 |
| 4,828,500 | 5/1989 | Seidel et al. | 434/247 |
| 5,171,012 | 12/1992 | Dooley | 463/2 |
| 5,462,275 | 10/1995 | Lowe et al. | 463/31 |
| 5,695,401 | 12/1997 | Lowe et al. | 463/4 |
| 5,882,204 | 3/1999 | Iannazo et al. | 434/247 |
| 5,890,906 | 4/1999 | Macri et al. | 463/4 |

*Primary Examiner*—Jessica J. Harrison
*Assistant Examiner*—John Paradiso
*Attorney, Agent, or Firm*—Hazel & Thomas, P.C.

[57] ABSTRACT

A system for analyzing offensive and defensive patterns of teams in team sports incorporates a device for inputting data on offensive/defensive patterns to be analyzed including data on individual player actions; a device for displaying the offensive/defensive pattern data including at least a graphical representation of a playing field with the data on the individual player actions represented thereon; a device for recording and playing back video images of an actual game for analysis; and a device for synchronizing at least the playing back of the video images from the recording and playing back device with the displaying of the offensive/defensive pattern data, whereby video images of the game are extracted and displayed in coordination with outputting and displaying of offensive/defensive pattern data selected for viewing. The displaying of the playing field representation and of the offensive/defensive patterns that are selected for viewing thereon synchronized with the displaying of selected video images related to the selected offensive/defensive pattern representations allows the viewing and analysis of the graphical representation with the video images.

18 Claims, 4 Drawing Sheets

SYSTEM AND METHOD FOR CONFIRMING AND CORRECTING OFFENSIVE AND/OR DEFENSIVE POSTURES IN A TEAM BALL GAME

BACKGROUND OF THE INVENTION

1. Field of Industrial Application

This invention relates to a method and a system for confirming and correcting an offensive and/or a defensive posture in a team ball game wherein a ball or similar materials in soccer, American football, basketball, rugby, volleyball, hockey and the like are employed.

2. Prior Art

As described above, it is not too much to say that victory or defeat in a team ball game is often decided based upon the use of a particular offensive and/or defensive formation composed of all the players in a team at a key point during the game. In other words, it becomes a key to the score to prepare a formation against that of the other party as a result of seeing promptly through the formation on the other side, i.e., the defensive formation when one is on the offensive side, and the offensive formation when on the defensive side.

Under such circumstances, it was heretofore common for the manager or leader of one of the opposing teams to call a meeting so as to confirm the use of an offensive and/or defensive formation. Specifically, such meetings are typically composed of discussions as, for example, on a defensive side, "if the offensive side uses, for example, the offensive formation of pattern A, we will oppose to it by using the defensive formation of pattern A; if the offensive side takes and offensive formation of pattern B, we will take the defensive formation of pattern B."

Typically, such meetings may be carried out using, for example, "blue" magnetic tips representing players on an offensive side and "red" magnetic tips representing players on a defensive side to illustrate either a certain offensive or defensive pattern with the tips being positioned on a steel board, in conjunction with discussion in the meeting.

However, there are an infinite variety of offensive and defensive formations of a team which may be suitably changed depending upon the type of game, the teams opposing one another, the progress of a game and the like, so that such formations are not unitary.

In this regard, one way of improving the above conventional system is to adopt a video image system as a better means for grasping, recording, and analyzing the changes in offensive and/or defensive patterns of a certain team. Furthermore, recorded video images may be used to comparatively examine the changed pattern of an opposing team with a pattern of one's own team.

U.S. Pat. No. 5,184,295 (issued on Feb. 2, 1993) discloses that model acting and the like have previously been recorded as video images, and these model acting video images are overlapped with an acting video image of a person who is to be coached by means of arithmetic processing or the like to obtain a stereoscopic video image, whereby a suitable coaching is conducted.

While this prior invention is suitable for sports or activities which proceed in comparatively "slow" pace as compared with the other sports, e.g., golf play, grasping and analyzing offensive/defensive patterns in team sports were substantially impossible to achieve, particularly in violent sports such as soccer and rugby.

Typically, over time, teams will change formation patterns, both offensive and/or defensive patterns, that are peculiar to or inherent in their team, and particularly with teams in violent sports like soccer.

SUMMARY OF THE INVENTION

Accordingly, if it is possible to see through offensive and/or defensive patterns of an opposing team and utilize that information for developing tactics for one's own team, such information becomes an effective weapon that will lead to victory. The method and the system of the present invention is directed to making possible the ability to easily see through offensive and defensive patterns of an opposing team, wherein offensive and defensive postures of the opposing team can be easily grasped and easily analyzed.

In the present invention, details of all or part of a game, as needed, are recorded by means of a video camera to grasp offensive and defensive patterns of the opposing team as described above, while required data or information on the game is synchronously inputted to a personal computer with the video images recorded by the aforesaid video camera. A characteristic feature of the method and the system according to the present invention resides in that, for example, when entry of information into the personal computer at the time of scoring a point is intended after finishing the game, the video images at that time can be simultaneously outputted with the information entry, whereby the formations as well as offensive and defensive patterns of both teams team can be grasped and analyzed.

For example, in the case of soccer, when a miss in passing a ball results in one losing a point, information on the offensive and defensive patterns at the instance of the miss described above may be obtained for analysis.

However, in such a team game, and particularly in case of a violent sport, it is substantially impossible to promptly input the information concerned to a personal computer and to store the information therein. Accordingly, another characteristic feature of the present invention resides in that only major information or data is inputted during a game, and after finishing the game, the video image is reproduced from the above-described video deck, so that further required information obtained thereby can be inputted again to the personal computer.

A further characteristic feature of the present invention resides in that basic offensive and/or defensive patterns under a certain period of time or certain conditions can be outputted on the display of a personal computer (PC) together with a variety of information and data entered via the keyboard of the PC or other input devices into the PC, whereby any of the basic patterns can be compared with a pattern from an actual game taking place by viewing the patterns either side by side, or in an overlapped manner.

In addition to the above, a still further characteristic feature of the present invention resides in that the basic patterns in the form of video images stored in the personal computer as well as video images of an actual pattern recorded through a videocassette recorder system are not outputted as still-frame images, but as moving video images so that differences in motion between the patterns can be identified and analyzed.

One feature of the present invention is that, in the situation where an offensive pattern of the opposing team used against a particular defensive pattern of one's own team resulted in the opposing team scoring, the simultaneous comparison of the two patterns may be used to identify and correct the deficiencies in the defensive pattern in countering the opposing team's use of that particular offensive pattern in the future. Therefore, the present invention can be used for correcting such deficiencies as missing a ball that was passed between players, and missing a ball that was being shot in a goal scoring attempt, such as in soccer or other similar games.

Another advantage of the present invention is that it allows one to identify and understand the flow of offensive and defensive patterns used by the opposing team during the entire game, whereby the resulting information may be utilized for planning and developing future defensive and offensive patterns for one's own team, as well as strategies for countering the opposing team's particular flow of offensive and defensive patterns.

Further, the present invention may be used to identify and analyze the characteristics of a particular player on the opposing team, such that countermeasures against patterns in which that particular player is used or actions/maneuvers for which that player is recognized as an expert may be developed. Accordingly, as described above, the present invention may be used to generate a considerable amount of information for developing and/or improving the offensive and defensive patterns of one's team that may in turn advantageously lead to greater success in competition.

DETAILED DESCRIPTION OF THE PREFERRED EMBODIMENT

Figure 1:
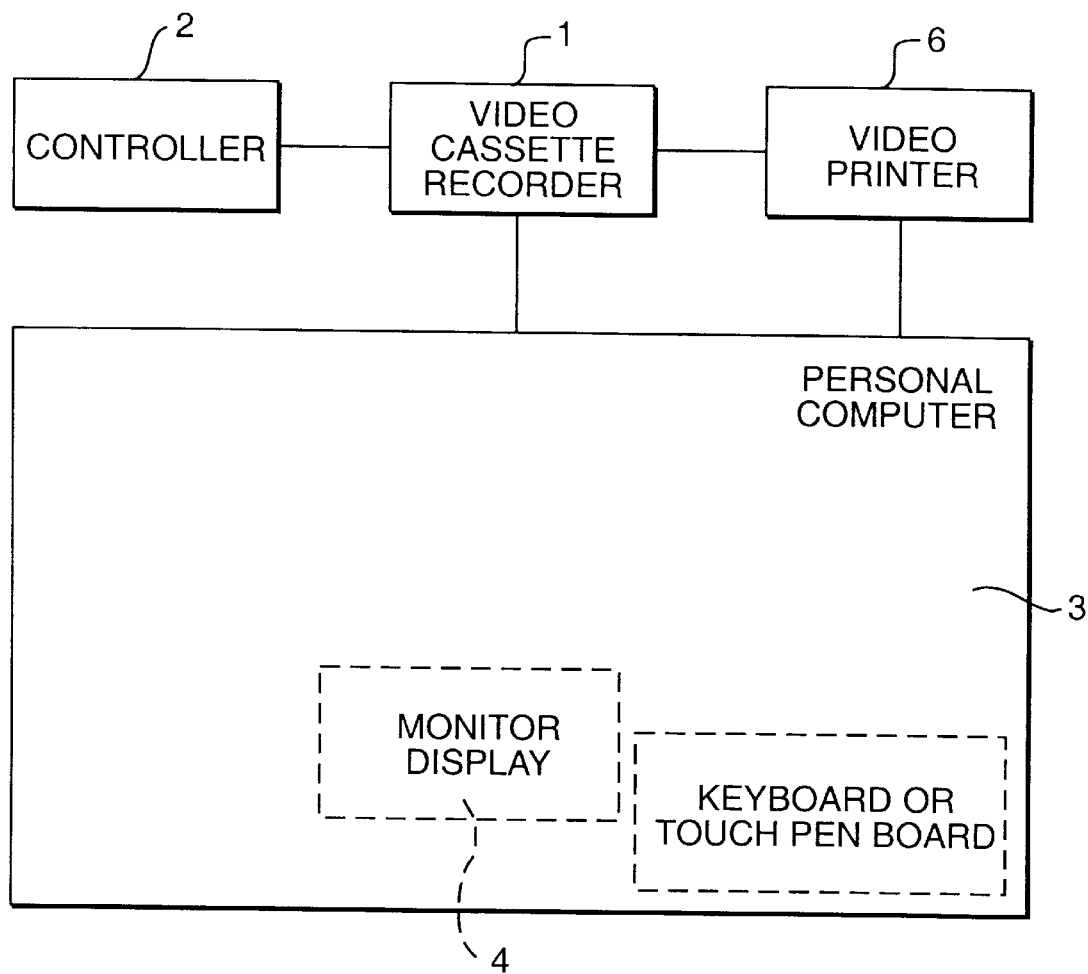
FIG. 1 illustrates a block layout diagram of the overall system of the present invention.

With reference to the figures, like reference characters will be used to indicate like elements throughout the several embodiments and views thereof. In particular, FIG. 1 is a block diagram showing the general system for implementing the present invention wherein reference numeral (1) designates a videocassette recorder containing a videotape. In this example, while an EVO-9650 videocassette recorder for Hi-8 videotape manufactured by Sony K.K. in Japan has been used in one embodiment of the present invention, any other videocassette recorder having equivalent performance as known in the art may, of course, be employed.

Reference numeral (2) designates a controller which is attached to the videocassette recorder (1), whereby desired scenes are searched, and still-frame video images or moving video pictures are outputted on a display. Controllers as known in the art may be used for implementing the controller (2).

Reference numeral (3) designates a personal computer for controlling and processing data either stored therein or inputted thereinto. In the present example, while PC-9801FA personal computer manufactured by Nihon Denki K.K. has been used in one embodiment of the present invention, it is to be noted that the personal computer (3) is not limited thereto, but any other personal computer device known in the art having equivalent performance may be employed. In addition, other computer or data processing devices as known in the art, i.e., laptop computers, minicomputers, mainframe computers, etc. may also be used in implementing the present invention.

Furthermore, reference numeral (6) denotes a video image printer by which a video image can be printed in hard copy. It is, however, not required to provide the printer in the case where no such hard copy is necessary. Otherwise, the video image printer (6) may be implemented using any printer device that is capable of interfacing with a computer and/or with a video cassette recorder as known in the art.

Reference numeral (7) designates an input device connected to the personal computer (3), such as a keyboard. Alternatively, the input device (7) may be implemented using a touch-panel operated by a touch-pen, a mouse or other similar device known in the art.

Figure 2:
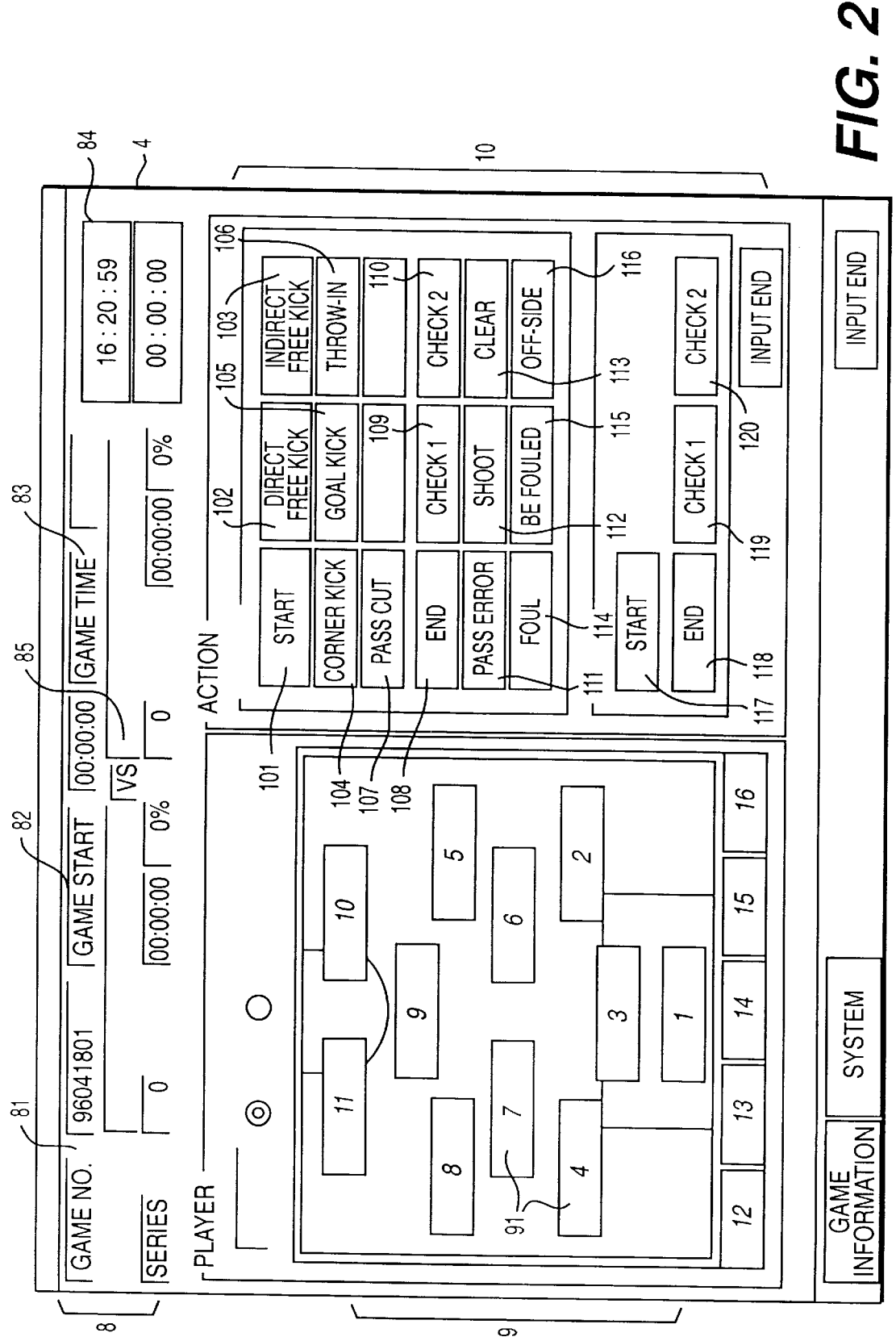
FIG. 2 shows a general view of an example initial menu display of the present invention as implemented on a personal computer.

FIG. 2 illustrates an example initial menu screen shown on the monitor display (4) of the personal computer (3) where the present invention is applied to a soccer game.

The initial screen is the menu displayed when entering required information. In the example of a soccer game, the information to be entered includes a wide range of items from the start time of kickoff to the ending time of the game. In the initial screen, there is a group of required data displayed (8) on the upper part of the monitor display (4). The required data is shown at least in alphanumeric form and includes at least the data number of a game (81), a starting time of the game (82), a finishing time of the game (83), a timer (84), and the names of the teams playing (85).

A ground display (9) on one side of the monitor display shows the assigned positions (91) of the players on the field. In this example, the ground (9) corresponds to a half of the actual soccer field, representing an area extending from the central position of the field to the goal position of one team with eleven players on one team displayed.

When a touch panel or mouse is used as the input device (7), the initial screen may also include a group display of dedicated entry keys (10) operating as a graphical interface for entering required information on the other side of the monitor display (4). These dedicated entry keys (10) are not limited to those illustrated in the figure, but they may be suitably selected or configured as required by the particular application.

The display as described above is configured so in order that the position and movement of various players in a pattern to be graphically displayed is determined by the position of the ball as in the case of soccer or other similar games. Generally, during play the ball will always belong in either the side of the field controlled by one's own team or the opposing team. As such, displaying only one-half of the field is sufficient. However, displaying a representation of the entire field may also be done in order to accommodate a specific application or specific requirements thereof.

As noted above, reference numeral (91) refers to indicators of the ground (9) display corresponding to the positions of the players with their respective names, which was previously inputted, displayed. Similarly, reference numeral (92) refers to indicators for reserve players (five members in case of soccer) displayed on the lower part of the ground (9) display of the monitor screen. When one of those player indicators (91 or 92) is actuated via the input device (7), i.e., touched with a touch-pen or pointed to with a mouse, additional information on the corresponding player that was previously inputted will be displayed.

As described above, the dedicated entry key group display (10) may be configured or selected as required by the particular and/or desired by the user. However, the entry key group display (10) should at least include the respective keys to allow the quick and efficient entry of such information as the start time of a game (101), occurrence of a direct free kick (102), occurrence of an indirect free kick (103), occurrence of a corner kick (104), occurrence of a goal kick (105), occurrence of a throw (106), occurrence of a cut in passing (107) and occurrence of the hike. In addition, respective keys for inputting additional information such as termination time of the game (108), check 1 (109) and check 2 (110) which will be described hereinafter, occurrence of a miss in passing (111), occurrence of a shot being taken (112), clear (113), occurrence of a foul play (114), being subjected to foul (115), and occurrence of an offside situation (116) should also be included.

The above-enumerated types of information defined for the individual entry keys in the group display (10) are designed primarily to input the corresponding data for one's own team. However, the respective keys in the group display (10) may also be defined for inputting information on the opposing team, such as entry keys for inputting at least a start time (117), a termination time (118), and the above-mentioned check 1 (119) and check 2 (120).

As noted above, the group display (10) includes a start time of the game entry key (101). In operation, when a game begins play, the start entry key (101) displayed on the monitor display (4) is activated. Synchronous with that key entry, the starting time of the game display (82) is activated, and the above described videocassette recorder (1) begins recording video images of the game.

As the game progresses, as events such as direct free kicks, indirect free kicks, corner kicks, goal kicks, ball throws, or cuts in passing performed by one's own team occur, information on those events is entered using the appropriate entry keys (102) through (107). Furthermore, events such as misses in passing, shots, clear, actions in fouling, actions in being subjected to foul, occurrences of out-of-bounds and the like are also entered by means of the entry keys (111) through (116), as appropriate. The entry keys are used to mark and record at least the times when the specific events they designate occur.

The entry keys for check 1 (109) and check 2 (110) are spare entry keys for inputting other information to be monitored or recorded from the game as required by the particular application or as desired by the user. With respect to the opposing team, similar additional information may be inputted through the entry keys check 3 (11) and check 4 (120). For example, data on events of notable plays and the like involving particular players is entered using the entry keys check 3 (119) and a check 4 (120).

When the game ends, the recording by the videocassette recorder (1) stops, while the entry of information via the group display entry keys (10) is completed. As one may well appreciate, in fast-moving games such as soccer, entering all the data to be recorded into the PC (3) only while the game is still progressing is substantially impossible. However, other games such as golf that are far slower, the entry of relatively large amounts of data into the PC (3) is considerably easier. For this reason, the videocassette recorder (1) that recorded the game is provided. The videocassette recorder allows a user to enter additional information while viewing the recorded video images of the game long after the game itself has already ended.

Figure 3:
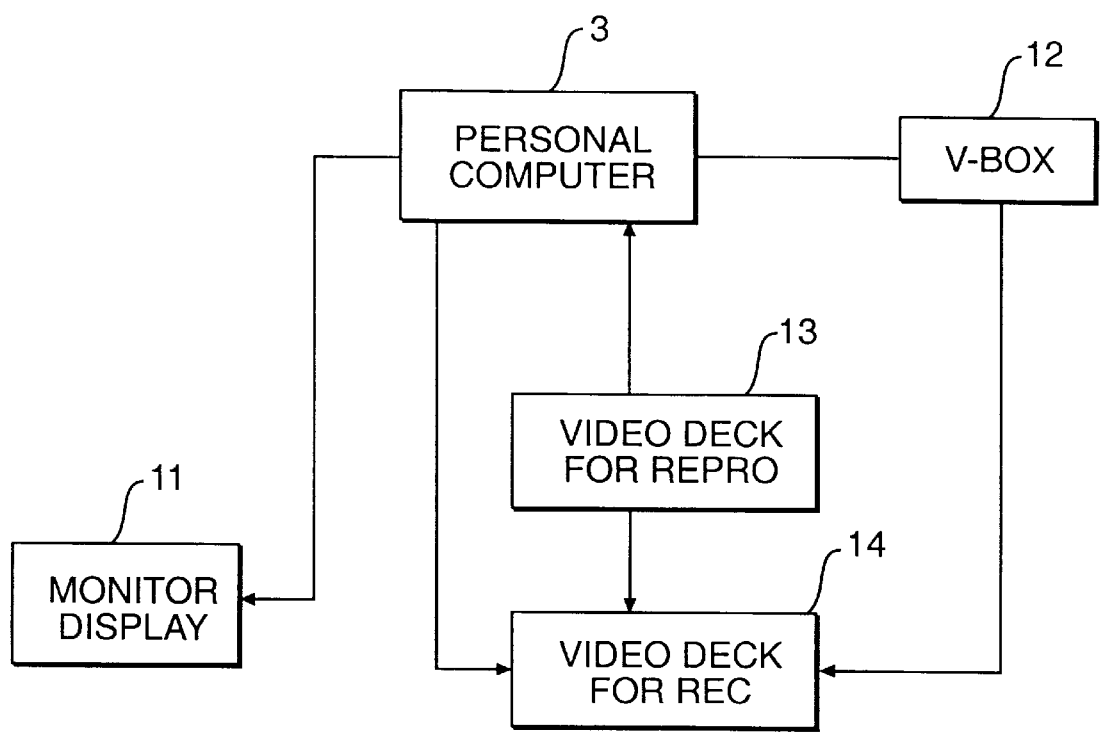
FIG. 3 illustrates a block diagram showing the general system for entering information in accordance with the present invention.

FIG. 3 is a block diagram showing an example of a reentrant system according to the present invention that is composed of the PC (3), another monitor display (11), a converter (12) for converting the signals from the PC (3) into video signals to be recorded, a first video deck (13) connected by means of a dedicated cable, and a second video deck (14) connected by means of a rank cable. The first video deck (13) is used to play back or reproduce the video images of the game that was recorded, while the second video deck 14 is used to record those video images from the first video deck 13 combined with images (e.g., text, animation, symbology, data monitor displays) generated by the PC (3) in conjunction with the video images from the first video deck (13). In the general operation of this system, signals from the first video deck (13) that contains a videocassette of the recorded game are transmitted to both the PC (3) and the second video deck (14). As the PC (3) generates images to be superimposed or otherwise combined with the video images from the first video deck (13), the images from the PC (3) are first processed through the converter (12) and then recorded with the second video deck (14) in combination with the video images from the first video deck (13). The PC (3) further outputs control signals to control the operation of the second video deck (14) and image signals to be displayed on the monitor display (11).

Figure 4:
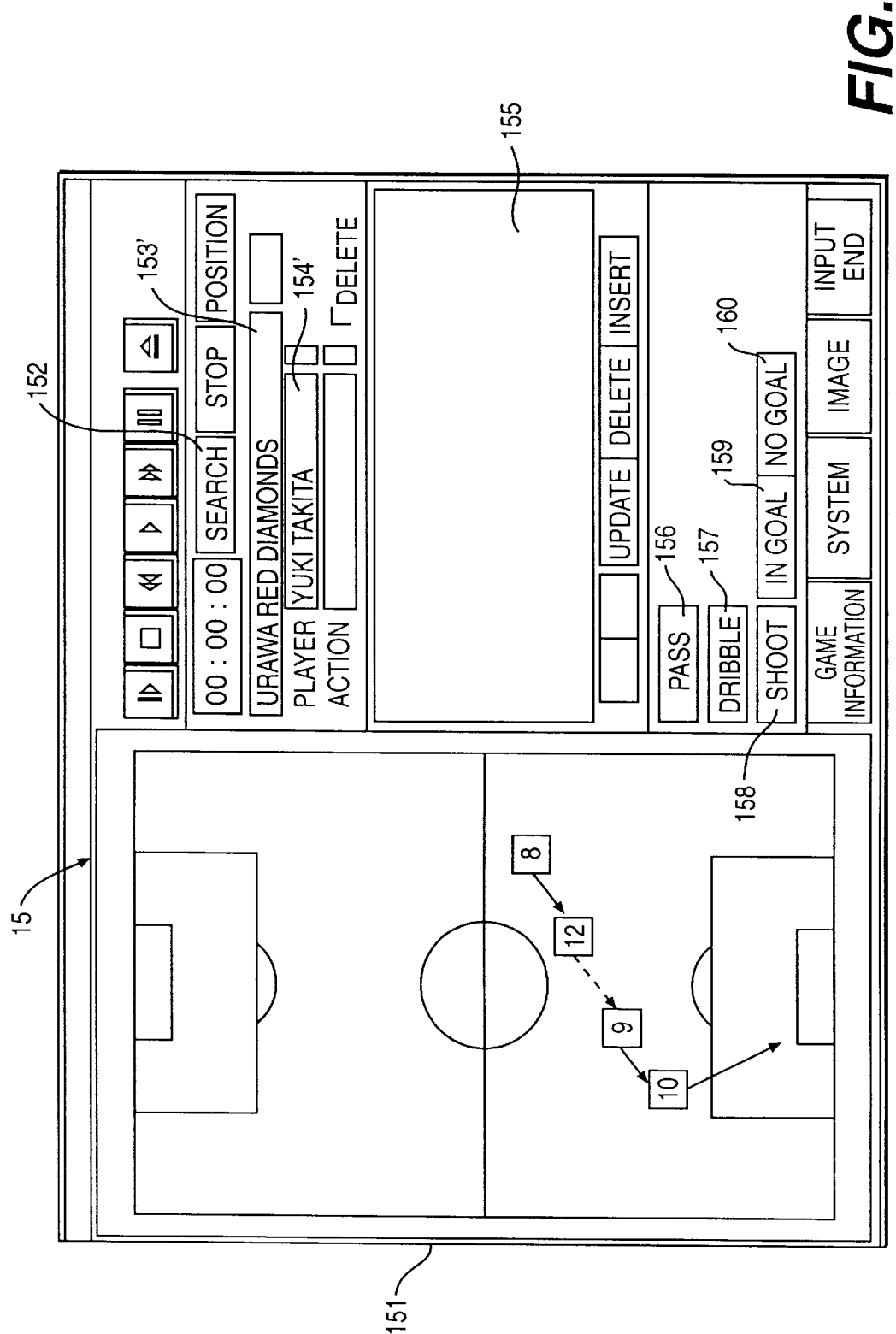
FIG. 4 shows a general view of an example reentrant and output menu display of the present invention as implemented on a personal computer.

In order to replay specific events recorded during the game, from the initial menu screen of FIG. 2, the corresponding entry key for the event is activated. At that point, the PC (3) switches to the reproduction menu screen (15) as illustrated in FIG. 4, and the video images related to that event are displayed on the monitor display (11). For example, to observe the occurrence of a miss in passing, the corresponding entry key (111) is selected. The reproduction menu screen (15) is displayed on the display (4) of the PC (3) while the video images of the miss in passing are outputted to the monitor display (11).

In the reproduction menu screen (15), on the left half of the display, a panoramic ground (151) view of the playing field is displayed. The right half of the display includes a search key (152) for searching for the time leading to the event to viewed (i.e., the miss in passing), and a plurality of dedicated graphical interface operation keys for displaying information such as the name of a team (153), the name of the player(s) involved in the event being viewed (i.e., the player who missed the passing of the ball) (154). The right half of the display also includes a window (155) which can be used to display alphanumeric or graphical data related to the event being viewed, for example, the circumstances leading to the miss in passing. Other dedicated graphical interface operation keys incorporated in the right half of the display are those for accessing data and images of actions such as passes (156), dribbles (157), shots (158), in-goals (159) and no-goals (160) such that those actions may be graphically arranged and represented on the panoramic ground view (151), as will be further explained hereinbelow.

Based on the operation of the present invention as described above, information on the occurrence of certain events during the game (i.e., the miss in passing the ball) can be used to determine and analyze the cause for those events. However, other features of the present invention may be used to further analyze and illustrate those events, such as by graphically illustrating the actions and/or behavior of the players before and during the event.

As shown in FIG. 4, the reproduction menu screen (15) further includes dedicated graphical interface operation keys A–D that activate different modes in the reproduction menu screen (15). As illustrated, activation of the mode A operation key will access and display data on the game being viewed, including, for example, activation of the initial menu screen illustrated in FIG. 2. Activation of the mode B operation key will access system information, including for example activation of other menu screens directed to the general operation of the PC (3).

When mode D is activated, data may be inputted into the system to analyze the game or events being viewed. In particular, in the panoramic ground view (151), the positions and actions of the players involved in the event may be graphically drawn or represented to further illustrate the circumstances that resulted in the event being viewed. For example, individual players represented by their jersey numbers may be illustrated as boxes other icons on the playing field. Different arrows or other graphical symbols may then be added to represent their actions, or the actions/movements of the ball during the event. Such different arrows or symbols are accessed through activation of the operation keys (156) to (160). For example, when the pass operation key (156) is activated to input the occurrence of a heading pass, an arrow with a solid line may then be drawn by the user between icons representing the players. Similarly, when the dribble operation key (157) is activated in the case of representing a dribbling pass, an arrow with a dotted line may be drawn by the user.

When the operation key for mode C is activated, the data inputted during mode D may be accessed and displayed on the reproduction menu screen (15). The actions of each player involved in the event being viewed may be graphically represented, whereby the flow and sequence of actions leading to the event being viewed may be displayed in the panoramic ground view (151) or in the window (155). In mode C, the operation keys (156) to (160) are used to access the data and graphical representations inputted during mode D. In addition, as is being done above for the actions and positions of players on one's own team in mode D as explained above, the formations, actions and/or positions of players on the opposing team may also be graphically inputted in mode D and then displayed in mode C.

For example, as graphically illustrated in FIG. 4, in mode C, when the pass operation key (156) is activated in conjunction with selecting the time when the ball being passed was missed, the reproduction menu screen (15) will display the graphical representations inputted as explained above. As shown in FIG. 4, the ball is passed from a player represented by icon 8 to a player shown by icon 12. The player shown by icon 12 is passing the ball to a player shown by icon 9 while dribbling the ball. Thereafter, the player shown by icon 9 tries to pass the ball to a player shown by icon 10 at which point the miss in passing the ball occurs resulting in the ball falling into the hands of the opposing team.

In a typical application of the present invention, the system would be operated by a manager or a leader on the team concerned with the cause of certain events during a game, with how certain formations or actions are being executed, etc. The information provided by the present invention allows such a user to analyze the specific details that caused the events to occur or that result in certain formations of actions being successful or unsuccessfuil in actual use. The information may therefore be used to correct problems and deficiencies such that they may be avoided in future games.

As in the example of the miss in passing the ball, the user of the present invention may find that the formation used during the games was inferior to that of the opposing team, wherein that inferior formation allowed the presence of an opposing player that interfered with the passing between the players identified by icons 9 and 10. Accordingly, a user would use the present invention to understand, devise and illustrate the tactics necessary to counter the presence of an opposing player when that formation is used again.

While the present example has been described with respect to soccer, it is not limited thereto but also applicable to ball games such as American football, basketball, rugby, volleyball and the like as well as to even any other team sports wherein other types of balls besides those for the games mentioned above are employed, such as hockey and the like. The system of the present invention is applicable to such other sports in a manner similar to that set forth in the above-described example, wherein the software program of the present invention would be modified suitably for rules, offensive and defensive patterns for a specific game as would be understood by one of skill in the art. Further, the implementation of the present invention not otherwise disclosed and detailed above are consistent with implementations of software and graphical operations as known and understood in the art.

What is claimed is:

1. A system for analyzing offensive and defensive patterns of teams in team sports, comprising:

means for inputting data on offensive and defensive patterns to be analyzed, said offensive/defensive pattern data including data on individual player actions;

means for displaying said offensive and defensive pattern data including at least means for displaying a graphical representation of a playing field with said data on said individual player actions represented thereon;

means for recording and playing back video images of an actual game for analysis; and means for synchronizing at least said playing back of said video images from said recording and playing back means with said displaying of said offensive/defensive pattern data, whereby video images of said game are extracted and displayed in coordination with outputting and displaying of offensive/defensive pattern data selected for viewing.

2. A system according to claim 1, wherein said means for inputting data on offensive and defensive patterns to be analyzed includes a plurality of dedicated entry keys for entering predetermined types of data, said data entry keys being operatively connected to input data in conjunction with said display means displaying entry of said offensive and defensive pattern data.

3. A system according to claim 1, wherein said display means is operatively connected with said data inputting means such that said display means displays a plurality of dedicated entry keys for entering predetermined types of data, said data entry keys being operatively connected to said data inputting means via said display means so as to input said offensive and defensive pattern data, and in conjunction with said display means displaying entry of said data.

4. A system according to claim 1, wherein said means for displaying said offensive/defensive pattern data further includes means for displaying data on at least one of a game start time, a game end time, a home team name, an opposing team name, and individual player names.

5. A system according to claim 1, wherein said means for displaying a graphical representation of a playing field with said data on said individual player actions represented thereon is further for displaying said graphical representation with data on at least one of individual player positions and individual player identifications.

6. A system according to claim 1, wherein said means for displaying a graphical representation of a playing field with said data on said individual player actions represented thereon is further for displaying said graphical representation with data on at least one of position and movement of a ball.

7. A system according to claim 1, wherein said means for recording and playing back video images of an actual game for analysis includes a video camera for recording video images of said game.

8. A system according to claim 1, wherein said synchronizing means is further for synchronizing at least said playing back of said video images with said graphical representation of said playing field and said individual player action data.

9. A system according to claim 1, wherein said synchronizing means includes a computer device having means for processing said offensive and defensive pattern data inputted via said data inputting means, and means for controlling operation of said display means and said video image recording and playing back means.

10. A system according to claim 9, wherein said means for recording and playing back video images of an actual game includes a video player device and a video recorder device, said video player device being operatively connected to output selected video image data to said computer device and said video recorder device, and said computer device being operatively connected to output display image data in conjunction with said selected video image data to said video recorder device so as to record said display image data in synchronism with said selected video image data.

11. A system according to claim 10, wherein said computer device includes a monitor display for displaying at least one said selected video image data and said display image data, and a converter device operatively connected between said computer device and said video recorder device for converting said display image data from said computer device into video display image data to be recorded in said video recorder device.

12. A method for analyzing offensive and defensive patterns of a team in a team sport, said method comprising the steps of:

providing video images of an actual game to be analyzed;

providing a graphical representation of offensive and defensive patterns to be analyzed in conjunction with said video images; and synchronizing said graphical representation with video images of said actual game, wherein said step of providing said graphical representation includes the steps of inputting data on said offensive/defensive patterns, generating a graphical representation of at least a playing field of said actual game, generating graphical representations of at least selected offensive/ defensive patterns for displaying on said playing field representation, and said step of synchronizing said graphical representation with said video images includes synchronizing displaying of said playing field representation and of said offensive and defensive patterns that are selected for viewing thereon with displaying of selected video images related to said selected offensive and defensive pattern representations, whereby said selected offensive and defensive pattern representations are viewed and analyzed in conjunction with said selected video images.

13. A method according to claim 12, wherein said step of providing said graphical representation further includes providing a graphical data entry interface for inputting said offensive and defensive pattern data via a plurality of dedicated data entry keys displayed with said graphical representation.

14. A method according to claim 12, wherein said step of synchronizing said graphical representation with said video images further includes synchronizing said inputting of data on said offensive/defensive patterns with said displaying of said selected video images.

15. A method according to claim 12, wherein said step of providing said graphical representation further includes the steps of inputting data on said individual player actions and generating graphical representations of at least selected individual player actions for displaying on said playing field representation.

16. A method according to claim 15, wherein said step of synchronizing said graphical representation with said video images further includes synchronizing said inputting of data for said selected individual player action representations that are selected for viewing thereon with displaying of selected video images related to said selected individual player action representations, whereby said selected individual player action representations are viewed and analyzed in conjunction with said selected video images.

17. A method according to claim 12, wherein said step of providing said graphical representation further includes the steps of inputting data on movements and positions of a ball and generating graphical representations of at least selected ball movements and positions for displaying on said playing field representation.

18. A method according to claim 17, wherein said step of synchronizing said graphical representation with said video images further includes synchronizing said inputting of data for said selected ball movement and position representations that are selected for viewing thereon with displaying of selected video images related to said selected ball movement and position representations.

* * * * *